Patented Sept. 5, 1922.

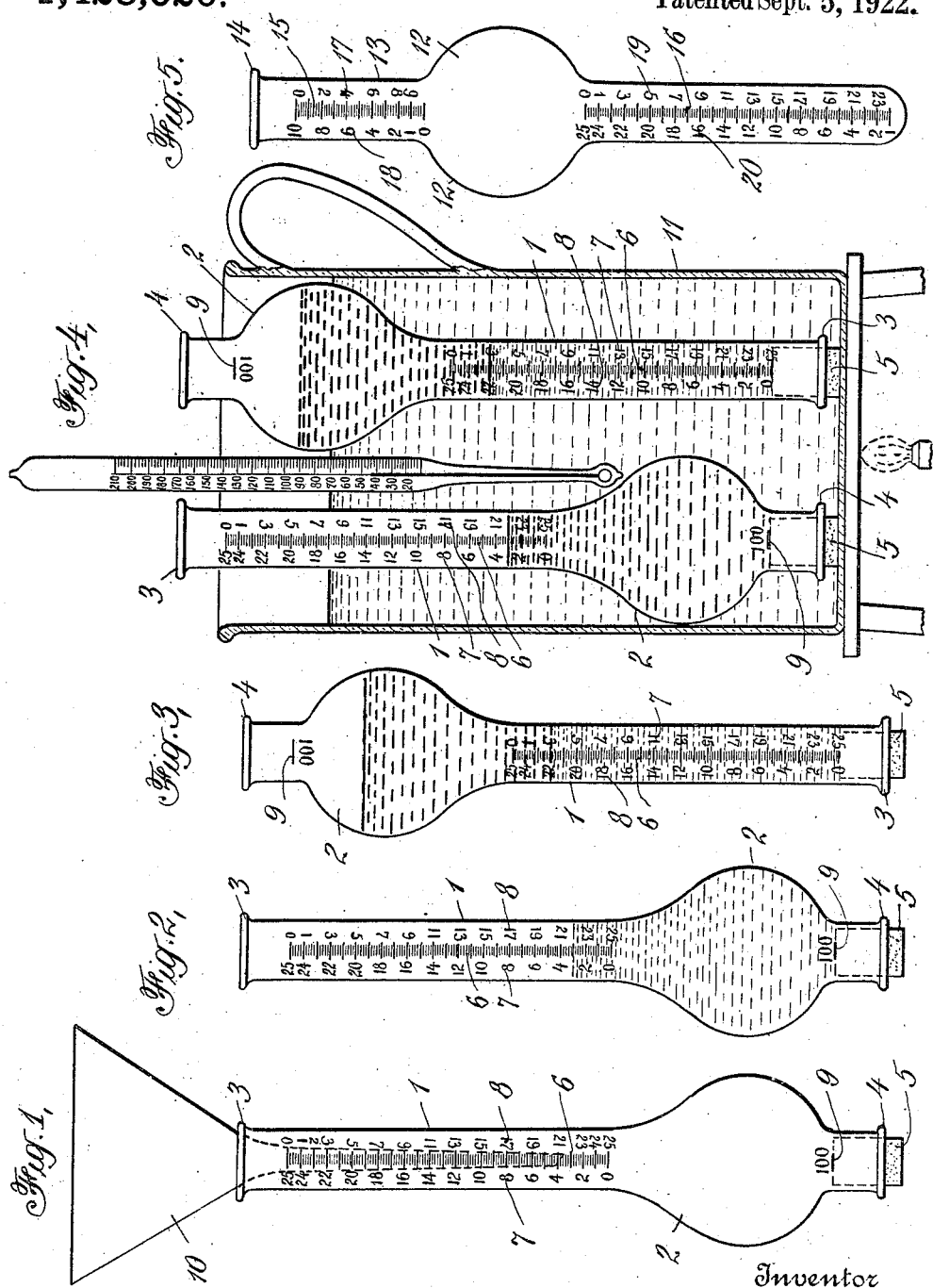

1,428,020

UNITED STATES PATENT OFFICE.

EDWARD HOLYOKE FARRINGTON, OF MADISON, WISCONSIN.

BUTTER TESTER.

Application filed February 21, 1921. Serial No. 446,661.

*To all whom it may concern:*

Be it known that I, EDWARD H. FARRINGTON, a citizen of the United States, residing at Madison, in the county of Dane, State of Wisconsin, have invented certain new and useful Improvements in Butter Testers; and I do hereby declare the following to be a full, clear, and exact description of the invention, such as will enable others skilled in the art to which it appertains to make and use the same.

My invention is an improvement in butter testers and relates to that class wherein the percentage of butter fat, and of other constituents, is determined by the relative volume of such constituents at selected temperatures.

In testing butter and the like, the operation is facilitated by reversing the tester, after a preliminary heating to a selected testing temperature. With the usual arrangement of scales, difficulty is experienced in reading them when in the reversed position. An object of the invention is to provide an arrangement of scale which may be read in either direction.

Another object is to provide a tester having intermediate its ends an enlargement of a size to hold a selected number of units of capacity, and scales adjacent to the enlargement indicating similar units of capacity, the enlargement usually having an aggregate capacity of one hundred of the units, whereby the excess of matter being tested outside the enlargement may be easily determined and at a glance, in terms of percentage of the contents of the enlargement.

In the drawings;

Figure 1 is a front elevation of the improved test showing the manner of introducing the butter to be tested, Figure 2 is a similar view with the funnel removed and the butter in place, Figure 3 is a similar view with the tester reversed, Figure 4 is a sectional view of a heater with the tester in two positions, Figure 5 is a front elevation of another embodiment of the invention.

In the embodiment of the invention shown in Figures 1, 2, and 3, a tubular structure is provided, of transparent material, or of material having a portion thereof transparent, as for instance of glass or the like. This structure 1 has near one end an enlargement 2 of approximately spherical outline, and both ends of the tubular structure are beaded as shown at 3 and 4, and formed to receive a stopper or cork 5. On the body of the structure, and extending from the enlargement, there is provided a scale, consisting of graduations 6, and a plurality of series 7 and 8 of indicating numerals. The structure is also provided with a graduation mark 9 at that end of the enlargement adjacent to the bead 4.

The enlargement of the structure, between the graduation 9 and the first graduation 6 of the scale is of a predetermined capacity in units; and the graduations on the scale indicate the capacity of the body of the structure in similar units. In the present instance the enlargement from the graduation 9 to the first graduation 6 has a capacity of one hundred units. The body of the structure from the first graduation 6 adjacent to the enlargement to the graduation remote from the enlargement has a capacity of 25 of the units. When, with this arrangement, a quantity of butter to be tested is inserted in the tester that depth of the butter which extends above the graduation 6 adjacent to the enlargement will be a definite and known percentage of that in the enlargement and such percentage will be indicated on the scale. The series 7 and 8 of indicating numerals read in opposite directions, the series 7 reading from the enlargement, from 0 to 25, while the series 8 reads towards the enlargement from 0 to 25. The distance from the bead 4 to the graduation 9 is the same as the distance from the bead 3 to that graduation 6 remote from the enlargement, and these graduations serve as indications for the depth of insertion of the stoppers 5, which stoppers are adapted to be used in either end of the tester.

The improved tester is used in the following manner. A sample of about three ounces, or any amount that would be a fair and representative sample of the butter to be tested, is placed in a six ounce, wide mouth, glass stoppered bottle, and the bottle and its contents is warmed to about 100° F., usually by placing it in warm water. When the butter melts to a thick liquid, the bottle is vigorously shaken. This mixes the fat, water, salt and curd of the butter into a homogeneous mass, and this or a portion thereof is poured into the tester, the end adjacent to the enlargement or bulb being closed by the stopper, which is pushed in to the graduation 9. A funnel 10 should be used in transferring the liquid butter to the tube, and the funnel should have a neck of a length sufficient to reach to the graduation 6 adjacent to the bulb or enlargement, in order that no butter may be left along the walls of the body of the tester, and care should be taken that no drops of butter adhere to the walls of the tester during the withdrawal of the funnel. The tester should be filled with the liquid butter to about the graduation 2, it being understood that preferably the predetermined unit is a centimeter.

The tester is then placed in a suitable receptacle 11 for water, as shown in Figure 4, and the water is heated to a temperature of about 140° F., and held at this temperature for about 10″, that is until a uniform temperature is reached. An exact reading of the height of the butter in the tester is recorded, and in this reading is important, as it is used later in calculating the final result. This reading may be for instance 2.6 meaning that there is exactly 102.6 c. c. of liquid butter in the tester at a tempreature of 140° F.

The tester is then placed in a water receptacle 11 and heated to near the boiling point. This heating contracts the curd, which will be seen in a layer between the fat and the brine or water of the butter. If the curd does not separate in a distinct layer, it may be dissolved by adding 5 c. c. or more of commercial sulphuric acid, or other solvent, and the tube may be whirled in a centrifuge for the purpose of separating the fat from the other component constituents of the butter mixture. As soon as the clear fat is obtained, the tube is allowed to cool a few degrees, and another cork or stopper 5 is inserted in the opposite end of the tester. This stopper is pushed in carefully, until the inner end thereof registers with that graduation 6 which is remote from the enlargement. During the insertion of this cork or stopper, care must be exercised that the first stopper is not displaced or loosened. After the stopper has been pushed to the graduation 25 of the scale, the tube is reversed, bringing the bead 4 toward the top, and the bead 3 toward the bottom, as shown in Figure 3. The cork in the end at the bead 4 is now removed, and the tube is placed as shown at the right of Figure 4 in the receptacle 11 or into a similar receptacle which is heated to near the boiling point. Or if desired the tester may be whirled in a centrifuge in order to bring the brine or water of the butter into the body or neck 1 of the tester. By examining the tester occasionally, it will be noticed that the fat of the butter is a clear layer in the bulb or enlargement, while the brine or water is in the neck, where it may be accurately measured, after placing the tube in the warm water and heating it to 140°, the same temperature at which the liquid butter was read when first placed in the tube.

The exact amount of the brine or water in the tester is read, by means of the graduations beginning at the zero point on the series of numerals 8. The per cent of fat in the butter may now be obtained by a simple calculation, or by a direct reading if the grading of the tube is properly done. By calculation the per cent of fat is found in the following manner. When for instance the amount of butter in the tester is 102.6 c. c., and the amount of brine or water 18 c. c., then 102.6—18 gives 84.6 c. c. of fat, which is 82.45% of 102.6. Therefore the butter contained 82.45% fat.

In Figure 5 there is a modified construction, wherein the enlargement 12 is arranged intermediate the ends of the tube 13. One end of the tube is open, being beaded as shown at 14 and this portion of the tube is of less length than that on the other side of the enlargement. Two series of graduations 15 and 16 are provided, a series being on each end of the tube, and adjacent to each series of graduations there is arranged two series of indicating numerals 17 and 18 for the graduations 13, and 19 and 20 for the graduations 16. The two series of numerals adjacent to each series of graduations are arranged in the same manner as the series of indicating numerals 7 and 8. That is one series reads from the enlargement and the other towards the enlargement, so that the scale may be easily read from either end of the tube. The adjacent graduations of the two series comprise between them a capacity of 100 of the units, centimeters in the present instance. That portion of the tube between the enlargement and the open end has a capacity of 10 c. c., and that portion of the tube between the enlargement and the closed end of the tube has a capacity of 25 c. c. This embodiment of the invention is used in exactly the same manner as that shown in Figure 1. In both embodiments, the capacity of the enlargement is a predetermined multiple of the total of the units of either scale. If desired a small quantity of a colored liquid, or coloring substance, which has a specific gravity, such that it will either remain between two of the liquids in one case or mix with one of them when another colored liquid is used, and thus furnish a distinct line or point from which to read on the scale, may be used.

I claim.

1. A tester of the character specified, comprising a tubular structure having near one end an enlargement, and a scale at each end extending from the enlargement, the graduations on the scales indicating capacity in units, and the enlargement having a capacity of a predetermined number of such units, and a predetermined multiple of the aggregate of the units on either scale, said scales being formed to read from either end of the structure.

2. A tester of the character specified, comprising a tubular structure having near one end an enlargement, and a scale at each end extending from the enlargement, the graduations on the scales indicating capacity in units, and the enlargement having a capacity of a predetermined number of such units, and a predetermined multiple of the aggregate of the units on either scale, said scales being formed to read from either end of the structure, and a series of indicating numerals at each side of each scale, the numerals at one side of the scale reading in the opposite direction to those at the other side.

3. A tester of the character specified, comprising a tubular structure having near one end an enlargement, and a scale at the other extending from the enlargement, the graduations on the scale indicating capacity in units, and the enlargement having a capacity of a predetermined number of such units, and a predetermined multiple of the aggregate of the units in that portion of the structure covered by the scale.

4. A tester of the character specified, comprising a tubular structure having near one end an enlargement, and a scale at the other extending from the enlargement, the graduations on the scale indicating capacity in units, and the enlargement having a capacity of a predetermined number of such units, and a predetermined multiple of the aggregate of the units in that portion of the structure covered by the scale, said scales being arranged to read in either direction.

5. A tester of the character specified, comprising a tubular structure having near one end an enlargement, and a scale at the other extending from the enlargement, the graduations on the scale indicating capacity in units, and the enlargement having a capacity of a predetermined number of such units, and a predetermined multiple of the aggregate of the units in that portion of the structure covered by the scale, said scales being arranged to read in either direction, both ends of the tube being open and either being adapted to be closed by a stopper to permit the tube to be inverted.

6. A tester of the character specified, comprising a tubular structure having a scale, the graduation on the scale indicating capacity in units, and a series of indicating numerals for the graduations on each side of the scale, the series on opposite sides of the scale being symmetrical to facilitate reading the scale in either direction.

7. A tester of the character specified, comprising a tubular structure having an enlargement intermediate its ends, and a scale at each end extending from the enlargement, the graduations on the scale indicating the capacity in units, and the enlargement having a capacity of a predetermined number of units and a predetermined multiple of the aggregate of the units on either scale.

8. A tester of the character specified, comprising a tubular structure having an enlargement intermediate its ends, and a scale at each end extending from the enlargement, the graduations on the scale indicating the capacity in units, and the enlargement having a capacity of a predetermined number of units.

In testimony whereof I affix my signature.

EDWARD HOLYOKE FARRINGTON.